United States Patent
Dinha

(10) Patent No.: US 9,699,135 B2
(45) Date of Patent: Jul. 4, 2017

(54) PRIVATE TUNNEL NETWORK

(75) Inventor: Francis Dinha, Dublin, CA (US)

(73) Assignee: OpenVPN Technologies, Inc., Pleasanton, CA (US)

( * ) Notice: Subject to any disclaimer, the term of this patent is extended or adjusted under 35 U.S.C. 154(b) by 892 days.

(21) Appl. No.: 13/528,682

(22) Filed: Jun. 20, 2012

(65) Prior Publication Data

US 2013/0347072 A1 Dec. 26, 2013

(51) Int. Cl.
- *H04L 29/00* (2006.01)
- *H04L 29/12* (2006.01)
- *H04L 29/06* (2006.01)
- *H04L 29/08* (2006.01)

(52) U.S. Cl.
CPC ...... *H04L 61/1511* (2013.01); *H04L 63/0272* (2013.01); *H04L 67/28* (2013.01); *H04L 61/6068* (2013.01)

(58) Field of Classification Search
CPC . H04L 63/0272; H04L 61/1511; H04L 67/28; H04L 61/6068
See application file for complete search history.

(56) References Cited

U.S. PATENT DOCUMENTS 8,464,335 B1* 6/2013 Sinha et al. .................. 726/13
2013/0283364 A1* 10/2013 Chang et al. ................ 726/12

* cited by examiner

*Primary Examiner* — Brandon Hoffman
*Assistant Examiner* — Helai Salehi
(74) *Attorney, Agent, or Firm* — Antero & Tormey, PC; Pete Tormey

(57) ABSTRACT

A processor-based system and method comprising a private tunnel connector operable to receive a network connection request, test the connection request for private network information, generate network connection information in response to the test, and respond to the network connection request with the network connection information. The testing may include accessing a DNS server for private network information, and receiving private domain information from a private domain server. The private tunnel connector is further operable to connect to a private domain server that is coupled to the private network connector through the Internet. The private domain server may include private cloud information such that users may create and access one or more private clouds using tunneling technologies. Domain servers and host machines may employ various encryption schemes to facilitate adding public Internet resources to the private cloud.

13 Claims, 3 Drawing Sheets

PRIVATE TUNNEL NETWORK

BACKGROUND

Currently the public Internet, designed to provide access to Internet resources and services, provides very little security against man-in-the-middle attacks. Also lacking is substantial privacy for the exchange of sensitive information, and protection against malicious encounters. The open design of the Internet allows for a wide range of communication, but that open design also thwarts attempts to provide reliable security.

One means of secure communications through the Internet is through the use of a virtual private network (VPN). This private network interconnects remote networks through public communication infrastructures such as the Internet. VPNs provide security through tunneling protocols and security procedures using encryption. Conventional uses of VPNs include securely connecting the branch offices of a bank to a head office network over the Internet. A VPN can also be used to interconnect two similar-type networks over a dissimilar middle network for example, thus alleviating interconnectivity issues.

In general there are two major types of VPNs: remote-access VPNs and Site-to-site VPNs. Remote-access VPNs let individual users connect to a remote network. Site-to-site VPNs allow inter-connection of networks of multiple. VPNs reduce costs by eliminating the need for dedicated leased lines between networks, because they use existing, lower cost, infrastructure to connect networks while, at the same time, adding a layer of security.

VPNs conventionally require remote users to be authenticated and make use of encryption techniques to prevent disclosure of private information to unauthorized parties. VPN users are able to access functionalities across networks, such as remote access to resources like files, printers, databases or internal websites in a secure manner.

Once connected, a VPN creates a so-called tunnel through the Internet. Tunnel endpoints generally authenticate before secure VPN tunnels can be established to ensure a proper tunnel exists. VPNs may use passwords, biometrics, two-factor authentication or other cryptographic methods to secure the tunnel. Network-to-network tunnels may also use digital certificates to allow the tunnel to establish automatically and without intervention from the user.

SUMMARY

Disclosed herein is a processor-based system and method for creating and maintaining private clouds using tunneling technologies. Certain embodiments may employ a private tunnel connector operable to receive a network connection request, test the connection request for private network information, generate new network connection information in response to the test, and respond to the network connection request with the new network connection information. The testing may include accessing a DNS server for private network information, and receiving private domain information from a private domain server. Certain embodiments may manipulate the A record or the CNAME attribute of a DNS entry to indicate the requested IP address is assigned to a domain.

The private tunnel connector may be further operable to connect to a private tunnel network domain server through the Internet. The private tunnel network domain server may include private cloud information related to the modified A record or CNAME entries. The private network domain server may associate that information with private cloud data such as users, IP addresses and the like. Once authenticated, the user sees networked services and resources via the private cloud. Users may create and access one or more private clouds, add new members, add resources, and access private and public resource available through a network such as the Internet.

Domain servers and host machines may employ various encryption schemes to facilitate adding public Internet resources to the private cloud. In certain embodiments end-to-end encryption is employed between a user and an online resource. In other embodiments a private tunnel server may decrypt traffic from the user for communicating with public Internet resources.

DESCRIPTION

Generality of Invention

Figure 1:
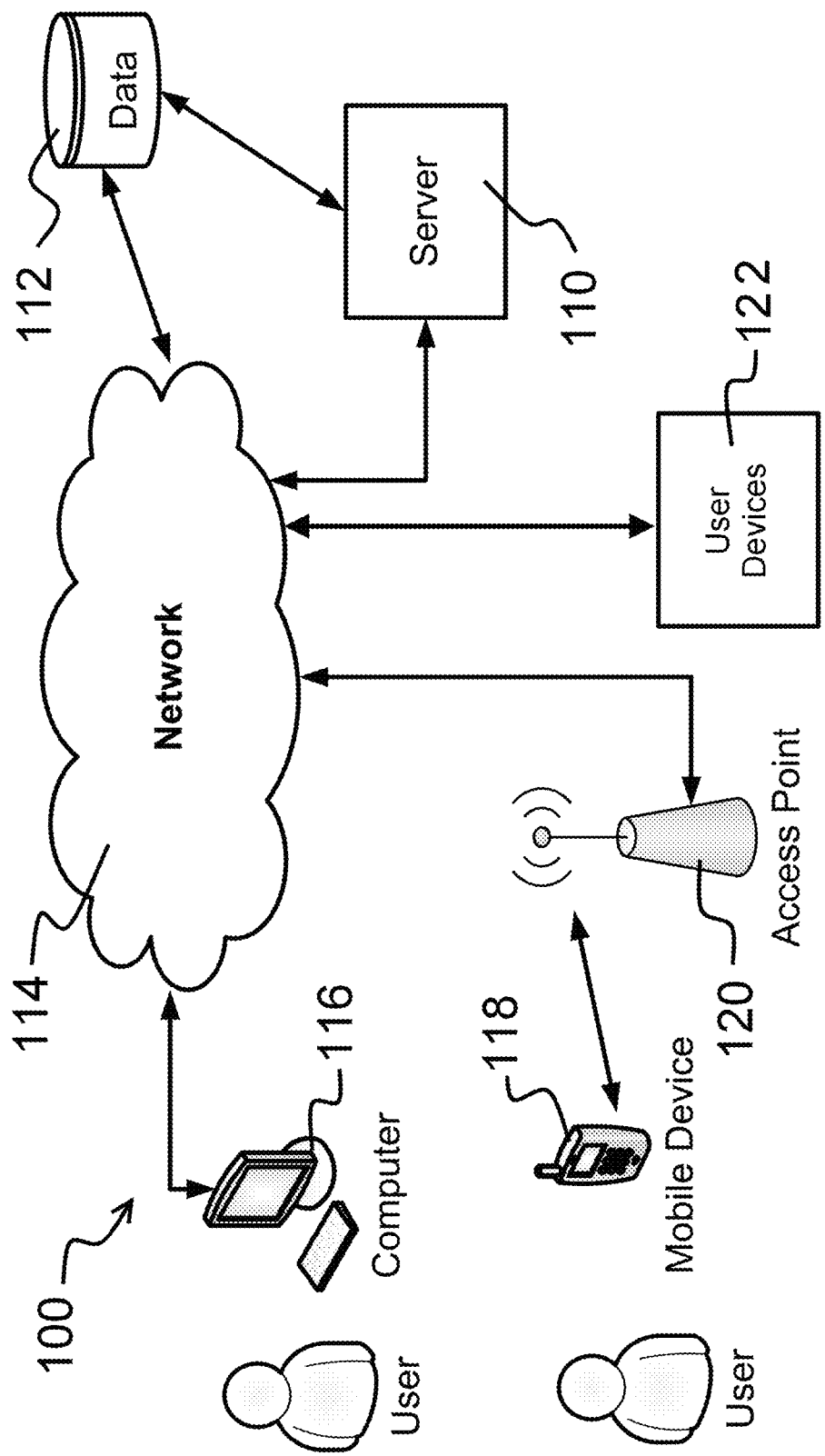
FIG. 1 shows a functional block diagram of a client server system that may be employed for some embodiments according to the current disclosure.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Read this application with the following terms and phrases in their most general form. The general meaning of each of these terms or phrases is illustrative, not in any way limiting.

Lexicography

The term "application programming interface" or "API" generally refers to a code-based specification intended to be used as an interface by software components to communicate with each other. An API may include specifications for routines, data structures, object classes, and variables.

The term "HTML Injection" generally refers to injecting HTML code into a web server's response to alter the content to the end user. This may also be known as cross site scripting.

The term "encapsulate" generally refers to a method of designing communication protocols in which logically separate functions in the network are abstracted from their underlying structures by inclusion or information hiding within higher level objects. Typically the more abstract layer is often called the upper layer protocol while the more specific layer is called the lower layer protocol.

The term "encryption" generally refers to the process of transforming information (referred to as plaintext) using an algorithm (called a cipher) to make it unreadable to anyone except those possessing special knowledge, usually referred to as a key. The result of the process is encrypted information (or ciphertext). The reverse process, making the encrypted information readable again, is generally referred to as decryption. The word encryption may also refer to the reverse process as well. For example, "software for encryption" often performs decryption.

The term "extension" and "browser extension" and the like generally refer to a computer program, applet or instructions that extend the functionality of a web browser in some way. Depending on the browser, the term may be distinct from similar terms such as plug-in or add-on.

The term "host machine" generally refers to a single processor-based machine that includes the elements of the system under discussion. However, this disclosure should not be read to limited a host machine in that manner when one having skill in the art will recognize that one or more of those elements may be performed remotely.

The word "Middleware" generally means computer software that connects software components or applications. The software consists of a set of enabling services that allow multiple processes running on one or more machines to interact across a network. Middleware conventionally provides for interoperability in support of complex, distributed applications. It often includes web servers, application servers, and similar tools that support application development and delivery such as XML, SOAP, and service-oriented architecture.

The term "Private Cloud" refers generally to a collection of computer resources and services which are coupled together either locally, remotely or some combination thereof, but the coupling limits access to a predefined user or group of users.

The term "Public IP Address" generally refers to a valid IP address that falls outside any of the IP address ranges reserved for private uses by Internet standards groups.

The term "service level agreement" (SLA) generally means an agreement between providers for Internet based computing resources such as servers, databases, and data storage systems and clients. SLAs generally contain details about what services are available, pricing for those services and availability for those resources. SLAs may also include workload, queue size, disk space availability, CPU load, network latency, or business metrics such as cost or location.

The terms "software as a service" or "SaaS" or "on-demand software" generally mean a software delivery model in which software and its associated data are hosted centrally such as on the Internet or cloud and accessed by users using a client. SaaS is a common delivery model for many business applications, including accounting, collaboration, customer relationship management (CRM), management information systems (MIS), enterprise resource planning (ERP), invoicing, human resource management (HRM), content management (CM) and service desk management.

The term "structured data" generally refers to data stored in a meaningful fashion such that a processor may be instructed to access the data. Examples include but are not limited to databases, relational databases, text files, XML file and the like.

The term "tunneling" generally refers to network protocol that encapsulates a different payload protocol. The use of tunneling may allow for carrying a payload over an incompatible delivery-network, or providing a secure path through an untrusted network.

The term "wireless device" generally refers to an electronic device having communication capability using radio, optics and the like.

The term "virtual machine" or "VM" generally refers to a self-contained operating environment that behaves as if it is a separate computer even though it is part of a separate computer or may be virtualized using resources form multiple computers.

The terms "virtual private network" and VPN generally refer to a private network that interconnects remote (and often geographically separate) networks and devices through primarily public communication infrastructures such as the Internet. VPNs provide security through tunneling protocols and security procedures such as encryption.

The acronym "XML" generally refers to the Extensible Markup Language. It is a general-purpose specification for creating custom markup languages. It is classified as an extensible language because it allows its users to define their own elements. Its primary purpose is to help information systems share structured data, particularly via the Internet, and it is used both to encode documents and to serialize data.

System Elements

Processing System

The methods and techniques described herein may be performed on a processor based device. The processor based device will generally comprise a processor attached to one or more memory devices or other tools for persisting data. These memory devices will be operable to provide machine-readable instructions to the processors and to store data, including data acquired from remote servers. The processor will also be coupled to various input/output (I/O) devices for receiving input from a user or another system and for providing an output to a user or another system. These I/O devices include human interaction devices such as keyboards, touch screens, displays and terminals as well as remote connected computer systems, modems, radio transmitters and handheld personal communication devices such as cellular phones, "smart phones" and digital assistants.

Certain embodiments may include mass storage devices such as disk drives and flash memory modules as well as connections through I/O devices to servers containing additional storage devices and peripherals. Certain embodiments may employ multiple servers and data storage devices thus allowing for operation in a cloud or for operations drawing from multiple data sources. The inventor contemplates that the methods disclosed herein will operate over a network such as the Internet, and may be effectuated using combinations of several processing devices, memories and I/O.

The processing system may be a wireless devices such as a smart phone, personal digital assistant (PDA), laptop, notebook and tablet computing devices operating through wireless networks. These wireless devices may include a processor, memory coupled to the processor, displays, keypads, WiFi, Bluetooth, GPS and other I/O functionality.

Client Server Processing

Client-server processing includes, but is not limited to operations between multiple processor-based devices wherein the processing is partially performed on different computing devices. Conventionally a server is coupled to one or more databases and to a network, although this disclosure need not be limited in that way. A user accesses the server by a computer communicably coupled to the network. Alternatively the user may access the server through the network by using a smart device such as a telephone or PDA. The smart device may connect to the server through an access point coupled to the network.

Conventionally, client server processing operates by dividing the processing between two devices such as a server and a smart device such as a cell phone or other computing device. The workload is divided between the servers and the clients according to a predetermined specification. For example in a "light client" application, the server does most of the data processing and the client does a minimal amount of processing, often merely displaying the result of processing performed on a server.

According to the current disclosure, client-server applications are structured so that the server provides machine-readable instructions to the client device and the client device executes those instructions. The interaction between the server and client indicates which instructions are transmitted and executed. In addition, the client may, at times, provide for machine readable instructions to the server, which in turn executes them. Several forms of machine readable instructions are conventionally known including applets and are written in a variety of languages including Java and JavaScript.

Client-server applications also provide for software as a service (SaaS) applications where the server provides software to the client on an as needed basis.

In addition to the transmission of instructions, client-server applications also include transmission of data between the client and server. Often this entails data stored on the client to be transmitted to the server for processing. The resulting data is then transmitted back to the client for display or further processing.

One having skill in the art will recognize that client devices may be communicably coupled to a variety of other devices and systems such that the client receives data directly and operates on that data before transmitting it to other devices or servers. Thus data to the client device may come from input data from a user, from a memory on the device, from an external memory device coupled to the device, from a radio receiver coupled to the device or from a transducer coupled to the device. The radio may be part of a wireless communications system such as a "WiFi" or Bluetooth receiver. Transducers may be any of a number of devices or instruments such as thermometers, pedometers, health measuring devices and the like. In certain embodiments any processing device may function as a server.

A client-server system may rely on "engines" or "agents" which include processor-readable instructions (or code) to effectuate different elements of a design. Each engine may be responsible for differing operations and may reside in whole or in part on a client, server or other device. As disclosed herein certain embodiments may include a display engine, a data engine, an interface engine, a user interface and the like. For example and without limitation, engines and agents may do one of more of the following:

Seek and gather information, including information about events, from remote data sources;
Display, or cause to be displayed, information to a user;
Perform calculations;
Store data locally and/or remotely.

FIG. 1 shows a functional block diagram of a client server system 100 that may be employed for some embodiments according to the current disclosure. In the FIG. 1 a server 110 is coupled to one or more databases 112 and to a public network 114 such as the Internet. The network may include routers, hubs and other equipment to effectuate communications between all associated devices. A user accesses the server by a computer 116 communicably coupled to the network 114. The computer 116 may include a sound capture device such as a microphone (not shown). Alternatively the user may access the server 110 through the network 114 by using a smart device such as a telephone or PDA 118. The smart device 118 may connect to the server 110 through an access point 120 coupled to the network 114. The mobile device 118 includes a sound capture device such as a microphone.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Private Tunnel

Figure 2:
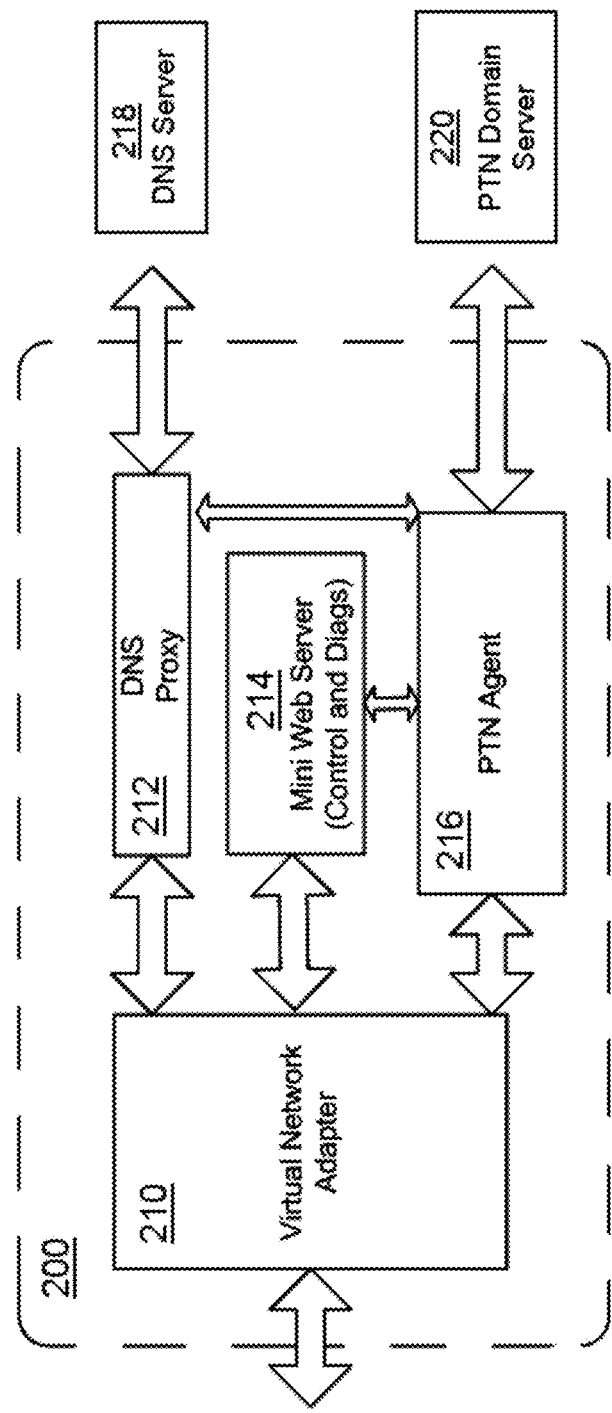
FIG. 2 illustrates certain components of a private tunnel network (PTN) connector.

A private tunnel network (PTN) provides a framework for effectuating private clouds for the purpose of enterprises such as Application Providers, Service Providers, Private Businesses, and the like to utilize a private tunnel service. The establishment of a private tunnel between a client and an application/service provider may be for providing web services, specific applications, unified threat management (UTM), firewall, and other services through the Private Tunnel. The PTN includes a predetermined communication protocol, systems for providing and managing PTN addresses, and systems for providing and managing encryption certificates for authenticating associated resources. The PTN may employ conventional techniques such as those found in virtual private networks (VPNs) to maintain security. In operation each logical device on the PTN network has a unique PTN address. In some embodiments a PTN can use existing addressing schema such as IPv4 or IPv6 as its internal addressing scheme. The PTN address may be supplied to the device during an initialization step by a global PTN address manager. Along with the PTN address, each device may also receive a signed cryptographic certificate from the global PTN address manager. In certain embodiments the cryptographic certificate may have a predetermined expiration time or may expire in response to certain usage limits FIG. 2 illustrates certain components of a private tunnel network (PTN) connector 200. A PTN connector 200 is an interface for IP based applications to resources and services which collectively may comprise a private cloud. The private cloud may be provisioned for a service provider, application provider, private business, or similar enterprise. The PTN connector 200 may abstract private cloud resources as a virtual IP network. In certain embodiments some MAC layer functionality may be included to allow PTN hosts to be IP gateways (infra). The PTN connector 200 may include a Virtual Network Adapter (TAP driver) 210 for interfacing a computer to a network, a DNS Proxy, a Mini Web Server 214, and a PTN Agent 216.

The DNS Proxy 212 forwards all DNS requests from the Virtual Network Adapter 210 to one or more DNS servers 218. In certain embodiments the DNS server 218 is locally coupled to the PTN connector 200. If the response from the DNS server 218 contains an A record with a predetermined IP address, which may be a special designated public IP address, then a response is not sent back to the requesting application but instead sent to the PTN Agent 216. The PTN Agent 216 performs a lookup of the host on a PTN domain server 220 returning either a PTN address corresponding to the host or a host not found message. If a PTN address is found, the VPN Agent 216 will allocate a free IP address from within its virtual subnet and pass it back to the DNS Proxy 212. The DNS proxy 212 will then insert this subnet address into the DNS response before sending the response back to the application. In some embodiments a virtual MAC address is also allocated. The DNS proxy 212 may also adjust the DNS response by reducing its TTL to allow for unused mapped PTN hosts to expire. If a PTN host lookup fails, the DNS Proxy 212 changes the DNS response to host-not-found.

One having skill in the art will appreciate that CNAME records may also be supported. For example and without limitation, if a host resolving to the predetermined IP resolves from a CNAME referenced host, this host is may be used for lookup. Moreover, the IP address of the PTN domain server 220 may be preprogrammed into the PTN agent 216, thus providing for a VPN between the host machine and the PTN Domain server 220 with the ability of accessing public DNS servers. In certain embodiments, the locally stored IP address may be dynamic in that the PTN domain server 200 may provide alternative IP addresses for communicating with it or other PTN domain servers.

One effect of the PTN connector 200 may be to redirect network requests to a completely private network by altering IP requests to include encapsulated or substituted IP addresses. The operation of the DNS server 218 and the PTN Domain server 220 create a private domain wherein the host machine sees network services and resources as provided by the PTN Domain server 220. Moreover, through the use of VPN or similar techniques the PTN Domain server 220 may act to provide secure communications between external resources. In certain embodiments, communications through a private tunnel may be directed to a private tunnel server that may then couple the host machine to available services or resources on the Internet. This has the effect of creating a private cloud with a VPN to the private tunnel server which operates as a bridge to other services and resource.

One having skill in the art will appreciate that in certain embodiments, the private tunnel network may operate parallel to normal public networks through the operation of the DNS server 218 because public IP addresses, those not flagged in the A record (or CNAME), are processed using normal operations. In other embodiments, public networks may be disabled by instructing the DNS Proxy 212 to change the DNS response to host-not-found for public IP addresses.

The PTN connector 200 may also include a mini web server 214 operable to listen on a TAP Driver IP address. The mini web server 214 may provide an out of band control channel and diagnostics. For example and without limitation, if an IP application wanted to obtain the PTN address of the connection abstracted to it as one of the virtual IP addresses, it can do so by making an HTML request to the PTN connector 200. Other function may include setting PTN attributes for connections and the like.

In certain operations, each PTN client to which an IP application connects to is represented as a unique IP and MAC address on virtual subnet local to the PTN Connector's 200 IP address. The PTN connector 200 appears to the host machine as a network controller with its own IP and MAC addresses. The entire subnet then may be virtualized, existing only within the scope of the host machine. This has the effect of allowing the PTN connector 200 to use virtual IP subnet overlapping or the same addresses as other PTN connectors through network address translation (NAT). For example and without limitation, the PTN connector 200 may use a dedicated public IP block for all of it's virtual IP networks assuring no IP conflicts to all users.

In certain embodiments the PTN agent 216 is a PTN client with its own PTN address. In operation the PTN client may connect on behalf of the host machine to all member private clouds as identified by the PTN Domain server 220. The PTN Agent 216 manages and performs all the network address translation (NAT) and the abstraction of PTN clients to IP clients. The PTN agent 216 may also manage a virtual Ethernet (Layer 2) network for any mapped virtual IP addresses. Those MAC addresses may be used to respond to any address resolution protocol (ARP) requests, and to forward any traffic destined to the MAC address. This has the effect of allowing the PTN connector 200 to present a truly local network to the host machine. It also has the effect of allowing for the host machine to use any of the PTN clients mapped into the PTN Connector's 200 virtual IP network as a gateway for routing.

Private Cloud

Figure 3:
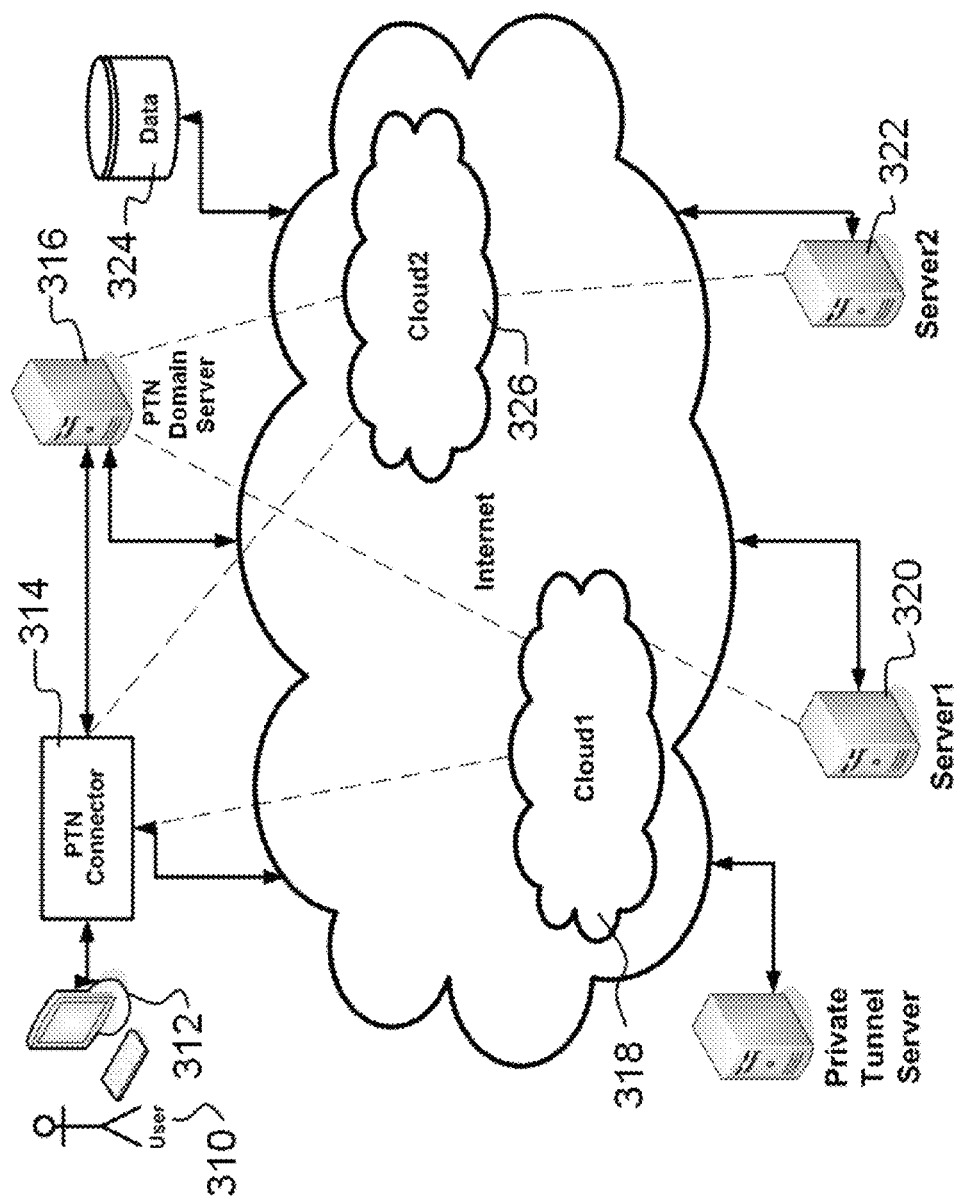
FIG. 3 shows a private tunnel network with multiple private clouds.

FIG. 3 shows a private tunnel network with multiple private clouds. As disclosed herein a private cloud may be effectuated by creating a private network having controlled access to shared services and resources. A user 310 using a host machine 312 is coupled to a PTN Connector 314. Each user 310 in the private cloud may have access to the resources and services exported by other users of the same private cloud. Each user 310 exporting resources may have the ability to granularly control which other users can access which of the exported resources and services.

A PTN domain server 316 is coupled to a PTN connector 314. As described herein the PTN connector 314 may operate to provide VPN connectivity to the PTN domain server 316. The PTN domain server 316 maintains information of all devices associated with a particular cloud (a cloud domain). For example and without limitation if the user 310 wants to have a private cloud 318, the PTN domain server 316 keeps the appropriate IP information for all the resources in the private cloud 318. By way of example only, private cloud 318 may include Server1 320 and Server2 322, while private cloud 326 may include Server1 302, server2 322 and data source 324. Users 310 may be associated with multiple private clouds and private clouds may have multiple users. Accordingly the PTN domain server 316 may maintain structured data including cloud resource information, cloud user information, encryption information and related information required to maintain cloud identification.

In operation the PTN domain server 316 receives a message (traffic) from a user, generally through a private tunnel connector. In certain embodiments the PTN domain server 316 may do one or more of the following:

Direct the traffic to one or more resources or services in the private cloud;

Provide signaling and control functions for operation of the private cloud;

Receive traffic, decode the traffic and forward to public resources and services.

One having skill in the art will appreciate that this list is not exhaustive and should not limit the operation of the PTN domain server in any way. For example and without limitation, in certain embodiments the users communicate directly without the need for traffic to pass through the PTN Domain server 316.

In addition to regular users, each private cloud may have multiple types of privileged users such as administrators, authenticators, and the like. For example and without limitation, administrators may have superior privileges allowing them to change any of private cloud configuration parameters while authenticator roles may be limited. Administrators may also act as authenticators. Administrators that own a particular cloud can define access control rules that prevent members from sharing their resources with the rest of the cloud. The administrator may manage access control over available resources in the cloud.

Clouds may be controlled using a single encryption key for each cloud. Multiple private clouds would each have their own encryption key. Moreover, the key may only be available to end-users and not to the PTN domain server or administrators. This has the effect of allowing secure communication between users of a private cloud with only those users having the ability to decode the message.

Resources in a cloud may be public to all members of a cloud, or personal such as a private file storage area. By way of example only, a resource might be a file sharing address/port, web server address/port, data base, files, and the like. The owner of a resource can define access control rules, subject to the cloud access control rules defined by the cloud administrator. These rules may include allowing or denying access from other members of the cloud.

In some embodiments a user may expose (or publish) resources to one or more clouds by indicating the resources and transmitting resource information to the PTN cloud server. The resource information may include one or more of location, type, a cloud name, a user name and the like. A non-limiting list of resources types includes servers, clients, data stores, software as a service providers and the like. Adding, modifying or deleting resources from a private cloud may be done graphically where a user selects an icon or other image representing a resource and drags that image into another image representing a private cloud.

In certain embodiments each private cloud may be hosted on one or more PTN servers or a server cluster. If a server cluster is used, all servers in the cluster may be interconnected to from a static private cloud hosted by one or more of the servers. This static private cloud may be used by the servers in the cluster to communicate with each other to optimize load and share configuration information.

Connecting Through a Private Cloud

In some embodiments a user connects to a private cloud using a user's PTN address. This PTN address would normally be a member of that private cloud to facilitate admittance. Upon successful user authentication (for example a web login) an authenticator adds the user's unique PTN address into the private cloud configuration as a member allowing the PTN user to connect to the cloud. Certain embodiments may also employ independent encryption authenticated for each connection. Once a user is a member of a private cloud, the user may connect to the private cloud and its associated members who expose their resources. A connection may be initiated by first looking up a PTN server hosting the desired private cloud configuration.

Load balancing may be effectuated through a control connection request to a PTN server which may accept the connection or redirect it to another PTN server for load balancing purposes. Once the connection is accepted, a secure, mutually authenticated (via cryptographic certificates) control connection is established. This control connection is used to setup and control a data connection between desired PTN hosts. This data connection may use the PTN server to forward all data, or it may be established directly between hosts using direct TCP or NAT firewall traversal which may be assisted by the PTN server.

In certain embodiments the connection may be secured by having both end points mutually authenticate each other using their cryptographic certificates. This has the effect that the data stream is securely encrypted and decrypted by end points providing point-to-point security where even the PTN server cannot decrypt the data. Subsequent connections may be made to other PTN addresses within the cloud by either using the same control connection (a new data connection may be established) or by creating a new control connection to a different PTN server. Some embodiments may include multiple encryptions schemes where a server receives traffics, decodes it and then re-encrypts the traffic before forwarding it to another destination.

Public Cloud Gateway

Connections through a PTN server using endpoint security may be extended into the public Internet. For example and without limitation, a user may connect to a PTN server using secure end-to-end communications while the PTN server (or other comparable machine) connects to the public Internet and passes traffic to the user. Thus the private tunnel extends through a first secure portion into the public domain. The PTN user sees publicly available resources such as social networks (Facebook, Twitter and the like), search engines (Google, Bing and the like), news sites, and blogs. Furthermore the PTN server may be operable to remove identifying information from traffic to the public Internet. In certain embodiments using the tools and procedures disclosed herein, a user may access a PTN server using a locally stored IP address, thus obviating the need to access a public DNS server.

Once connected to the PTN server, the public cloud gateway user may create a private cloud shielded from unwanted users, but capable of accessing public Internet sites anonymously or through spoofed credentials. Moreover, tools such as URL filtering, monitoring, threat management, anti-virus, and the like may be employed.

PTN LAN Gateway

In certain embodiments a local area network (LAN) Gateway may allow a private tunnel LAN to connect to a remote PTN connector. This has the effect of allowing the LAN Gateway to export network resources from the LAN to a private cloud. This PTN LAN Gateway may map a unique PTN address to each exported resource (local server). It may also map a local LAN IP address (a pool of which might be available to the PTN LAN Gateway) to each PTN user connecting to the resource. This allows for a PTN LAN Gateway to act as an alternative to installing a PTN connector on each server.

Access Points

In certain embodiments the PTN Connector 200 may be effectuated as part of a wireless access point (AP) or incorporated into a router or wireless router. This has the effect that the host machine does not need to have a local user physically attached. Users who couple to the AP may see a public Internet, a private tunnel network or both public Internet and private tunnel access.

One having skill in the art will appreciate that the PTN connector 200 may be effectuated in the operating system of the AP using conventional programming techniques, firmware, and hardware.

PTN Portal

A PTN portal may include a user interface that allows a user to track any connected devices and resources, as well as manage access to resources and services. The portal may be effectuated as a web-based interface to the local PTN Connector or LAN Gateway. Using the portal a user can visualize devices on the same private cloud which are running PTN connectors or LAN Gateways, and, in certain embodiments, browse resources or services on the private cloud. Using the portal may allow a user to command the PTN Connector or Gateway to perform specific tasks, such as joining a particular private cloud, managing credentials and other tasks as set forth herein.

The portal may also be used by an application provider, service provider, private business, and enterprise to deliver specific applications and services to end users. For example and without limitation, Face Book might offer a Facebook application on a private tunnel portal enabling a user to connect through a private tunnel to Facebook Cloud and access its services privately and thus completely eliminate "man-in-the-middle" attacks of snooping because the private tunnel is private and secure tunnel between a user and Facebook.

The Portal may also be used to create a new private cloud, and then invite other users to join this new cloud. Invitations can be extended to other users, who can use the predetermined credentials to identify and authenticate themselves to a new private cloud. The private cloud owners/providers might also allow any users (without invitation) utilizing private tunnel access to its services/applications. In some embodiments a private cloud owner/provider may operate its own registration and authentication system.

Data Center

In operation a private tunnel network may allow for private clouds comprised of geographically separated data centers. This has the effect of creating a fabric of data centers allowing the user to securely move data from a first data center to another data center. In certain embodiments a user may set up a private cloud while in a first geographic position. Then the user, from another geographic location, may access the private cloud to access the remote data sources.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A device comprising: a processor;
   a memory, coupled to said processor;
   a private tunnel connector coupled to said processor, said private tunnel connector operable to:
   receive a network connection request;
   query a first domain name server (DNS) for a predetermined internet protocol (IP) address associated with the network connection request;
   query a second domain server for a private tunnel address in response to the predetermined IP address;
   generate network connection information including the private tunnel address, and respond to the network connection request with the network connection information.

2. The device of claim 1 wherein the first domain name servicer returns an A record with the predetermined IP address.

3. The device of claim 1 wherein the network connection information includes a public IP address.

4. The device of claim 1 wherein the private tunnel connector is further operable to generate network connection information including a host not found indication.

5. The device of claim 1 wherein the private tunnel connector further includes a private tunnel network agent.

6. The device of claim 1 wherein the private tunnel connector is further operable to alter MAC level information with the effect of providing a local network to a host machine.

7. A method including:
   receiving a network connection request;
   querying a first domain name server (DNS) for a predetermined internet protocol (IP) address associated with the network connection request;
   querying a second domain server for a private tunnel address in response to the predetermined IP address;
   generating network connection information including the private tunnel address, and responding to the network connection request with the network connection information.

8. The method of claim 7 wherein the first DNS server returns an A record or CNAME indication.

9. The method of claim 7 wherein private tunnel address is received from a private tunnel network server.

10. The method of claim 7 further including:
    establishing a private tunnel connection to a private tunnel network server.

11. The method of claim 9 wherein the private tunnel network server is remote.

12. The method of claim 10 wherein the connection is encrypted.

13. The method of claim 10 wherein the private tunnel network server includes membership information for a private cloud, said membership information including at least one of either a user, a domain, or an IP address.

* * * * *